(12) United States Patent
Fukusako

(10) Patent No.: US 7,891,335 B2
(45) Date of Patent: Feb. 22, 2011

(54) CONTROL SYSTEM FOR INTERNAL COMBUSTION ENGINE

(75) Inventor: Takaaki Fukusako, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/453,927

(22) Filed: May 27, 2009

(65) Prior Publication Data
US 2009/0306876 A1 Dec. 10, 2009

(30) Foreign Application Priority Data
Jun. 6, 2008 (JP) ............................. 2008-148699

(51) Int. Cl.
F02D 41/08 (2006.01)
(52) U.S. Cl. .................. 123/399; 123/361; 123/339.14; 123/198 F
(58) Field of Classification Search ................. 123/399, 123/339.14, 306, 90.15, 198 F, 90.11, 361
See application file for complete search history.

(56) References Cited

U.S. PATENT DOCUMENTS

| 5,481,461 | A  | * | 1/1996  | Miyamoto et al. | ............ | 701/99 |
| 6,935,308 | B1 | * | 8/2005  | Nakamoto et al. | .......... | 123/395 |
| 7,013,866 | B1 | * | 3/2006  | Prucka et al.   | ............... | 123/319 |
| 7,628,136 | B2 | * | 12/2009 | Lyon            | ........................ | 123/198 F |

FOREIGN PATENT DOCUMENTS

| JP | 2-22221       | 12/1985 |
| JP | 07-133716 A   | 5/1995  |
| JP | 10-103097 A   | 4/1998  |
| JP | 2008-057402 A | 3/2008  |

OTHER PUBLICATIONS

Japanese Office Action 2008-148699 dated Mar. 23, 2010.

* cited by examiner

Primary Examiner—Hai H Huynh
(74) Attorney, Agent, or Firm—Squire, Sanders & Dempsey (US) LLP

(57) ABSTRACT

A control system for an internal combustion engine having a plurality of cylinders and a cylinder halting mechanism for halting operation of at least one of the plurality of cylinders by stopping operation of at lease one intake valve of the at least one cylinder. The control system includes an intake air control valve for controlling an amount of air supplied to the engine. An opening of the intake air control valve is changed when performing an increase in a number of operating cylinders in an idling condition of the engine. A basic opening of the intake air control valve is switched from a first basic opening corresponding to the number of operating cylinders before the increase in the number of operating cylinders to a second basic opening corresponding to the number of operating cylinders after the increase in the number of the operating cylinders. The basic opening is corrected in the closing direction during a predetermined time period when increasing the number of operating cylinders.

7 Claims, 3 Drawing Sheets

CONTROL SYSTEM FOR INTERNAL COMBUSTION ENGINE

BACKGROUND OF THE INVENTION

1. Field of the Invention

The present invention relates to a control system for an internal combustion engine having a cylinder halting mechanism for halting the operation of some of a plurality of cylinders by stopping the operation of intake valves of the cylinders, and particularly to a control system which performs a control for changing the number of operating cylinders in an idling condition of the engine.

2. Description of the Related Art

Japanese Patent Publication No. H2-22221 (JP-'221) discloses a control system wherein the intake air flow rate of the engine is changed when changing the number of operating cylinders in the idling condition of the engine. According to this control system, a signal for changing an opening of an intake air flow rate control valve is output when a predetermined time period has elapsed from the time a switching instruction signal for instructing a change in the number of operating cylinders is output. Therefore, the change timing of the intake air flow rate is delayed by a time period corresponding to a delay time period until the operating cylinder number is actually changed in response to the switching instruction signal of the operating cylinder number, so that the change timing of the operating cylinder number is made to coincide with the change timing of the intake air flow rate.

When performing a step change in the opening of the intake air flow rate control valve accompanied by the change in the operating cylinder number, as shown in JP-'221, there is a problem as described below.

In the operating condition where the operation of some of the cylinders is stopped, the operation of the intake valves of halting cylinders is stopped. Accordingly, the intake pressure at a portion of the intake pipe downstream of the throttle valve (intake air flow rate control valve) becomes higher than the pressure obtained when performing the all-cylinder operation. Upon switching from the partial-cylinder operation to the all-cylinder operation, the intake pressure at the portion downstream of the throttle valve does not immediately change even if the throttle valve opening is changed stepwise. Consequently, the intake air flow rate of the engine temporarily becomes excessive, so that the engine rotational speed in the idling condition greatly exceeds a target rotational speed and it takes a comparatively long time period until the engine rotational speed returns to the target rotational speed.

SUMMARY OF THE INVENTION

The present invention was made contemplating the above described point, and an object of the present invention includes providing a control system for an internal combustion engine, which can appropriately perform an intake air flow rate control when increasing the number of operating cylinders in the idling condition of the engine, to suppress a fluctuation in the idling rotational speed.

To attain the above object, the present invention provides a control system for an internal combustion engine having a plurality of cylinders and a cylinder halting mechanism (20) for halting operation of at least one of the plurality of cylinders by stopping operation of at least one intake valve of the at least one cylinder. The control system includes an intake air control valve (3) for controlling an amount of air supplied to the engine, and intake air amount control means for changing an opening (TH) of the intake air control valve when performing an increase in a number of operating cylinders in an idling condition of the engine. The intake air amount control means includes switching means and correcting means. The switching means switches a basic opening (THCB) of the intake air control valve from a first basic opening (THCBIP) corresponding to the number of operating cylinders before the increase in the number of operating cylinders to a second basic opening (THCBIA) corresponding to the number of operating cylinders after the increase in the number of the operating cylinders. The correcting means corrects the basic opening (THCB) in the closing direction during a predetermined time period (TTR0) when increasing the number of operating cylinders.

With this configuration, when increasing the number of operating cylinders in the idling condition of the engine, the basic opening of the intake air control valve can be switched from the first basic opening corresponding to the number of operating cylinders before the increase to the second basic opening corresponding to the number of operating cylinders after the increase, and the basic opening can be further corrected in the closing direction during the predetermined time period. Therefore, the amount of air supplied to the engine can be prevented from temporarily becoming excessive, to suppress the fluctuation in the idling rotational speed or in the engine output torque.

In one embodiment, the correcting means may set a correction amount (THTR) for correcting the basic opening (THCB) in the decreasing direction to a predetermined amount (THTR0) at the same time the switching means switches the basic opening (THCB), and thereafter gradually decreases the correction amount (THTR).

With this configuration, the correction amount of the basic opening may be set to the predetermined value (at the same time the basic opening is switched), and thereafter the correction amount is gradually decreased. The intake pressure at the portion downstream of the intake air control valve approaches the value suitable for the number of operating cylinders as the time elapses from the switching of the number of operating cylinders. Consequently, the air supply amount can be maintained at a proper value by gradually decreasing the correction amount.

In one embodiment, the control system further includes rotational speed detecting means for detecting a rotational speed (NE) of the engine, and ignition timing control means for controlling an ignition timing (IGLOG) of the engine so that the detected rotational speed (NE) coincides with a target rotational speed (NEOBJ).

With this configuration, the ignition timing can be controlled so that the detected rotational speed coincides with the target rotational speed. Consequently, it is possible to surely avoid the fluctuation in the engine rotational speed after changing the number of operating cylinders.

The present invention also provide a control method for an internal combustion engine having a plurality of cylinders, a cylinder halting mechanism for halting operation of at least one of said plurality of cylinders by stopping operation of at lease one intake valve of said at least one cylinder, and an intake air control valve for controlling an amount of air supplied to said engine. The control method comprises changing an opening of said intake air control valve when performing an increase in a number of operating cylinders in an idling condition of said engine, by switching a basic opening of said intake air control valve from a first basic opening corresponding to the number of operating cylinders before the increase in the number of operating cylinders to a second basic opening corresponding to the number of operating cylinders after the increase in the number of the operating cylinders. The control method also includes correcting the basic opening in the closing direction during a predetermined time period when increasing the number of operating cylinders.

The present invention further provide a control system for an internal combustion engine having a plurality of cylinders and a cylinder halting mechanism for halting operation of at least one of said plurality of cylinders by stopping operation of at lease one intake valve of said at least one cylinder. The control system comprises an intake air control valve configured to control an amount of air supplied to said engine, and an intake air amount control unit configured to change an opening of said intake air control valve when performing an increase in a number of operating cylinders in an idling condition of said engine. The intake air amount control unit comprises a switching unit configured to switch a basic opening of said intake air control valve from a first basic opening corresponding to the number of operating cylinders before the increase in the number of operating cylinders to a second basic opening corresponding to the number of operating cylinders after the increase in the number of the operating cylinders, and a correcting unit configured to correct the basic opening in the closing direction during a predetermined time period when increasing the number of operating cylinders.

DETAILED DESCRIPTION OF THE PREFERRED EMBODIMENTS

Preferred embodiments of the present invention will now be described with reference to the drawings.

Figure 1:
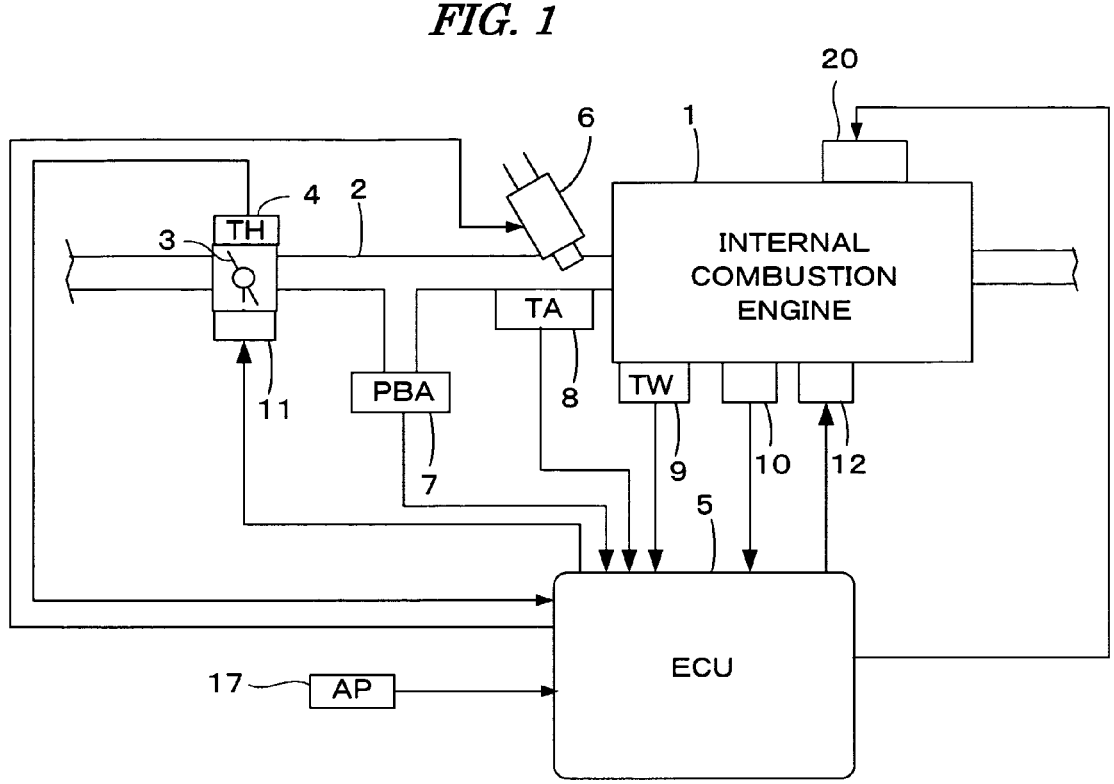
FIG. 1 shows a configuration of an internal combustion engine and a control system therefor according to one embodiment of the present invention.

FIG. 1 is a schematic diagram showing a configuration of an internal combustion engine and a control system therefor according to one embodiment of the present invention. An internal combustion engine 1 (hereinafter referred to as merely "engine") has an intake pipe 2 provided with a throttle valve 3. The throttle valve 3 may be provided with a throttle valve opening sensor 4 for detecting an opening TH of the throttle valve 3, and a detection signal of the throttle valve opening sensor 4 can be supplied to an electronic control unit 5 (hereinafter referred to as "ECU"). An actuator 11 for actuating the throttle valve 3 can be connected to the throttle valve 3, and the operation of the actuator 11 may be controlled by the ECU 5.

A fuel injection valve 6 is provided for each cylinder at a position slightly upstream of an intake valve (not shown). Each injection valve may be connected to a fuel pump (not shown) and electrically connected to the ECU 5. A valve opening period of the fuel injection valve 6 is controlled by a signal from the ECU 5. Each cylinder of the engine 1 can be provided with a spark plug 12. The ECU 5 supplies an ignition signal to each spark plug 12.

An intake pressure sensor 7 for detecting an intake pressure PBA may be provided immediately downstream of the throttle valve 3, and an intake air temperature (TA) sensor 8 may be provided downstream of the intake pressure sensor 7. Further, an engine coolant temperature sensor 9 for detecting an engine coolant temperature TW is mounted on the body of the engine 1. The detection signals of these sensors 7 to 9 can be supplied to the ECU 5.

A crank angle position sensor 10 for detecting a rotational angle of the crankshaft (not shown) of the engine 1 is connected to the ECU 5. A signal corresponding to the detected rotational angle of the crankshaft can be supplied to the ECU 5. The crank angle position sensor 10 includes a cylinder discrimination sensor which outputs a pulse (hereinafter referred to as "CYL pulse") at a predetermined angle position of a specific cylinder of the engine 1. The crank angle position sensor can also include a TDC sensor which outputs a TDC pulse at a crank angle position of a predetermined crank angle before a top dead center (TDC) starting an intake stroke in each cylinder (i.e., at every 120 degrees crank angle in the case of a six-cylinder engine) and a CRK sensor for generating a CRK pulse with a crank angle period (e.g., period of 30 degrees, shorter than the period of generation of the TDC pulse). The CYL pulse, the TDC pulse and the CRK pulse may be supplied to the ECU 5. The CYL pulse, the TDC pulse and the CRK pulse can be used to control various timings, such as the fuel injection timing and the ignition timing, and to detect an engine rotational speed NE.

An accelerator sensor 17 for detecting a depression amount AP of an accelerator pedal of the vehicle driven by the engine 1 (the depression amount will be hereinafter referred to as "accelerator operation amount") can be connected to the ECU 5, and the detection signal of the accelerator sensor 17 may be supplied to the ECU 5.

The engine 1 may include a cylinder halting mechanism 20 for halting the operation of some of the plurality of cylinders (for example, 3 cylinders in 6 cylinders) by stopping the operation of the intake valves of the cylinders. The cylinder halting mechanism 20 is connected to the ECU 5. The ECU 5 may supply a switching control signal to the cylinder halting mechanism 20, to perform a switching control for switching between an all-cylinder operation in which all cylinders are operating and a partial-cylinder operation in which the operation of some of the cylinders is stopped, according to the operating condition of the engine 1.

The ECU 5 can include an input circuit having various functions including a function of shaping the waveforms of the input signals from the various sensors, a function of correcting the voltage level of the input signals to a predetermined level, and a function of converting analog signal values into digital signal values. The ECU 5 may further include a central processing unit (hereinafter referred to as "CPU"), a memory circuit, and an output circuit. The memory circuit preliminarily stores various operating programs to be executed by the CPU and the results of computation or the like by the CPU. The output circuit supplies drive signals to the fuel injection valve 6, the actuator 11, the ignition plug 12, and the cylinder halting mechanism 20. The ECU 5 performs a control of the valve opening period of the fuel injection valve 6, an ignition timing control of the spark plug 12, and a switching control of the number of operating cylinders, based on the detection signals of the sensors described above. The ECU 5 also calculates a target opening THCMD of the throttle valve 3 according to the accelerator operation amount AP, and performs a drive control of the actuator 11 so that the detected throttle valve opening TH coincides with the target opening THCMD.

In the idling condition of the engine 1, the partial-cylinder operation is normally performed. In one embodiment, if the partial-cylinder operation continues for about 10 minutes, for example, the partial-cylinder operation is switched to the all-cylinder operation. This switching is performed because the pistons are operating also in the halting cylinders, and the lubricating oil easily flows into the combustion chambers of the halting cylinders.

Figure 2:
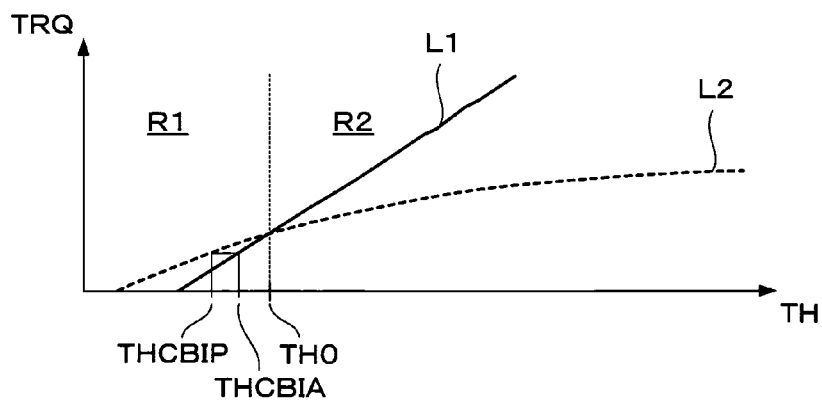
FIG. 2 illustrates a relationship between a throttle valve opening (TH) and an engine output torque (TRQ)

FIG. 2 shows one example of a relationship between the throttle valve opening TH and the output torque TRQ of the engine 1, according to an embodiment of the invention. The solid line L1 corresponds to the all-cylinder operation, and the dashed line L2 corresponds to the partial-cylinder operation. In the region R1 shown in FIG. 2, where the throttle valve opening TH is less than a predetermined opening TH0, the output torque TRQ in the partial-cylinder operation becomes greater than that in the all-cylinder operation even if the throttle valve opening TH takes the same value. On the other hand, in the region R2 where the throttle valve opening TH is greater than the predetermined opening TH0, the output torque TRQ in the partial-cylinder operation becomes less than that in the all-cylinder operation even if the throttle valve opening TH takes the same value.

In this embodiment, a basic throttle valve opening THCB in the idling condition may be set to a value in the region R1. Therefore, when the partial-cylinder operation is switched to the all-cylinder operation, the basic throttle valve opening THCB is switched from a basic value THCBIP for the partial-cylinder operation to a basic value THCBIA for the all-cylinder operation, in order to prevent the fluctuation in the output torque TRQ. As shown in FIG. 2, the basic value THCBIP for the partial-cylinder operation may be set to a value less than the basic value THCBIA for the all-cylinder operation.

A target opening THCMD of the throttle valve 3 in the idling condition of the engine 1 can be calculated by the following equation (1).

$$THCMD = THCB - THTR + THFB \quad (1)$$

where THCB is a basic throttle valve opening which can be set according to the number of operating cylinders (according to whether the partial-cylinder operation or the all-cylinder operation is performed); THTR is a transient state correction term which can be made effective immediately after the switching from the partial-cylinder operation to the all-cylinder operation; and THFB is a feedback control term which can be set so that the detected engine rotational speed NE coincides with a target rotational speed NEOBJ in the idling condition.

Figure 3:
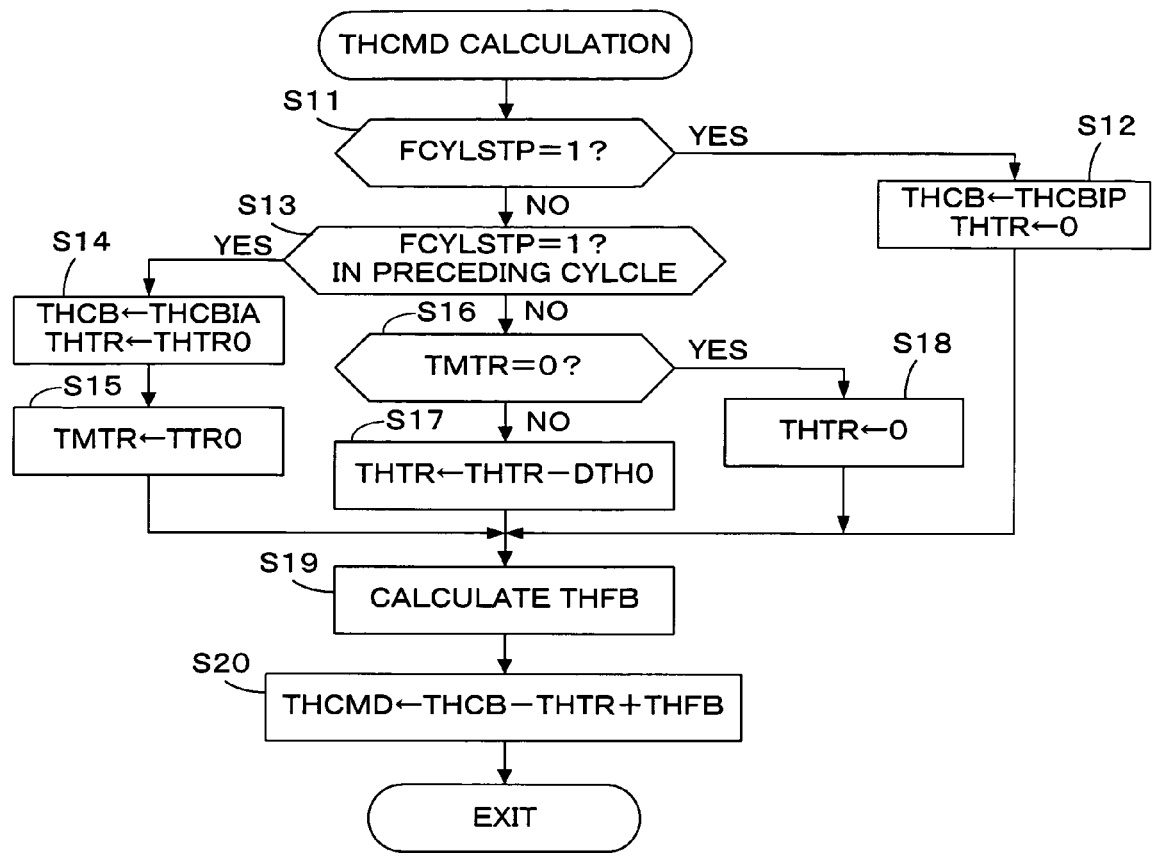
FIG. 3 is a flowchart of a process for calculating a target opening (THCMD) of a throttle valve in the idling condition.

FIG. 3 illustrates one example of a flowchart of a process for calculating a target throttle valve opening THCMD in the idling condition of the engine, according to one embodiment of the invention. This process may be executed by the CPU in the ECU 5 at predetermined time intervals.

In step S11, it is determined whether or not a cylinder-halt flag FCYLSTP is equal to "1". The cylinder-halt flag FCYLSTP can be set according to the engine operating condition in a process (not shown) for controlling the number of operating cylinders. In the idling condition of the engine, the cylinder-halt flag FCYLSTP is normally set to "1", and the partial-cylinder operation is performed. Accordingly, the process proceeds to step S12, in which the basic throttle valve opening THCB is set to the basic value THCBIP for the partial-cylinder operation, and the transient state correction term THTR is set to "0".

Thereafter, the process proceeds to step S19, to calculate a feedback control term THFB. A feedback control gain of the feedback control term THFB can be set to a comparatively small value so that the engine rotational speed NE is controlled so as to converge to a target rotational speed NEOBJ more slowly compared with the feedback control of the ignition timing described below. Therefore, the feedback control term THFB hardly changes when changing the number of operating cylinders, and the engine rotational speed NE is maintained at the target rotational speed NEOBJ by the feedback control of the ignition timing.

In step S20, the basic throttle valve opening THCB, the transient state correction term THTR, and feedback control term THFB are applied to the equation (1), to calculate a target throttle valve opening THCMD.

If the answer to step S11 is negative (NO), i.e., the cylinder-halt flag FCYLSTP is changed to "0", the process proceed to step S13, in which it is determined whether or not the cylinder-halt flag FCYLSTP was "1" in the preceding execution of this process. Since the answer to step S13 is affirmative (YES) immediately after switching from the partial-cylinder operation to the all-cylinder operation, the process proceeds to step S14, in which the basic throttle valve opening THCB is set to the basic value THCBIA for the all-cylinder operation and the transient state correction term THTR is set to a predetermined initial value THTR0 (e.g., 2 degrees). In step S15, a downcount timer TMTR is set to a predetermined time period TTR0 (e.g., 0.5 seconds) and started. Thereafter, the process proceeds to step S19.

Thereafter, the answer to step S13 becomes negative (NO), and the process proceeds to step S16, in which it is determined whether or not the value of the downcount timer TMTR started in step S15 is equal to "0". Since the answer to step S16 is initially negative (NO), the transient state correction term THTR is decreased by the following equation (2). In the equation (2), THTR on the right side is a preceding calculated value of the transient state correction term, and DTH0 is a predetermined subtraction term set, for example, to "0.02" degrees.

$$THTR = THTR - DTH0 \quad (2)$$

After execution of step S17, the process proceeds to the step S19.

The answer to step S16 becomes affirmative (YES) when the predetermined time period TTR0 has elapsed from the time of switching from the partial-cylinder operation to the all-cylinder operation. Accordingly, the process proceeds to step S18, in which the transient state correction term THTR is set to "0". Thereafter, the process proceeds to step S19.

Figure 4:
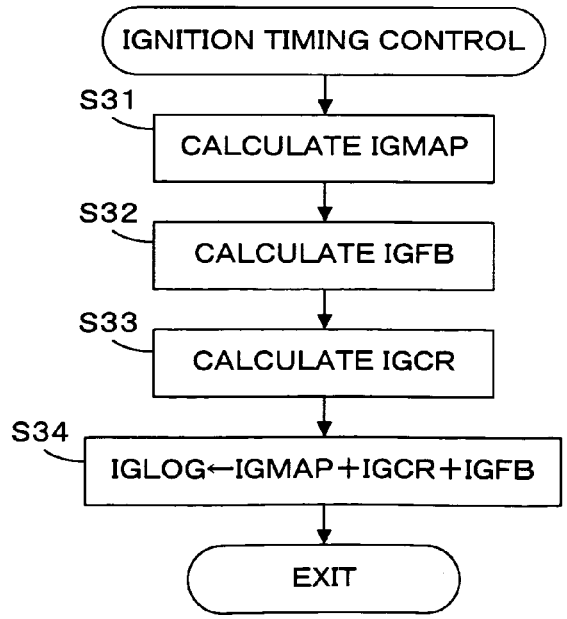
FIG. 4 is a flowchart of a process for performing an ignition timing control in the idling condition.

FIG. 4 illustrates an example of a flowchart of an ignition timing control process in the idling condition of the engine 1, according to one embodiment of the invention. This process can be executed by the CPU in the ECU 5 in synchronism with generation of the TDC pulse.

In step S31, a basic ignition timing IGMAP may be calculated according to the engine rotational speed NE and the intake pressure PBA. In step S32, a feedback correction term IGFB may be calculated so that the engine rotational speed NE coincides with the target rotational speed NEOBJ. The feedback correction term IGFB is set to a negative value when correcting the basic ignition timing IGMAP in the retarding direction.

In step S33, another correction term IGCR which does not include the feedback correction term IGFB may be calculated. In step S34, the basic ignition timing IGMAP, the feedback correction term IGFB, and the correction term IGCR can be applied to the following equation (3), to calculate an ignition timing IGLOG.

$$IGLOG = IGMAP + IGFB + IGCR \quad (3)$$

Figure 5A:
FIGS. 5A-5D are time charts for illustrating the control operation by the processes of FIGS. 3 and 4.

FIGS. 5A-5D are time charts for illustrating the control process of FIGS. 3 and 4, according to one example of the invention. As shown in FIG. 5A, an example of the control operation wherein the cylinder-halt flag FCYLSTP changes to "0" from "1" (the partial-cylinder operation is switched to the all-cylinder operation) at time t0 is shown.

Figure 5B:
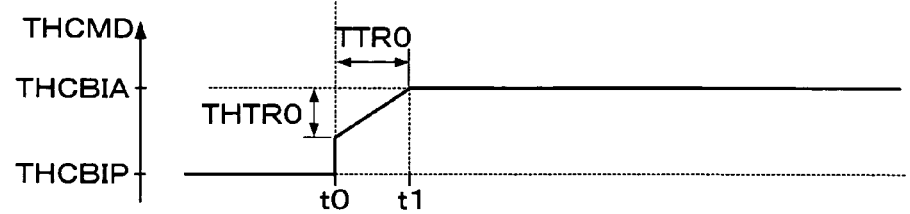

At the time the all-cylinder operation starts (time t0), the basic throttle valve opening THCB can be switched from the basic value THCBIP for the partial-cylinder operation to the basic value THCBIA for the all-cylinder operation, and the transient state correction term THTR can be set to the predetermined value THTR0. Therefore, the target throttle valve opening THCMD is set to (THCBIA-THTR0) at time t0 as shown in FIG. 5B. Thereafter, the target throttle valve opening THCMD can be controlled to gradually increase. The transient state correction term THTR is set to "0" at time t1 when the predetermined time period TTR0 has elapsed from time t0. Accordingly, the target throttle valve opening THCMD coincides with the basic value THCBIA for the all-cylinder operation, and is thereafter maintained at the value THCBIA.

Figure 5C:

The ignition timing IGLOG is corrected in the retarding direction, as shown in FIG. 5C, so that the engine rotational speed NE may be maintained at the target rotational speed NEOBJ. Accordingly, the engine rotational speed NE can be prevented from increasing as shown by the dashed line L11 in FIG. 5D.

Figure 5D:
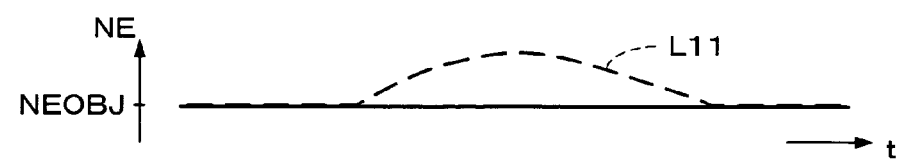

It is to be noted that the increase amount of the engine rotational speed NE becomes greater than the dashed line L11 in FIG. 5D, if the transient state correction term THTR in not applied to the calculation of the target throttle valve opening THCMD. If only the correction with the transient state correction term THTR is performed and the retard correction of the ignition timing IGLOG is not performed, some improvement can be obtained. However, by correcting the ignition timing IGLOG in the retarding direction using the feedback correction term IGFB, the engine rotational speed NE can be further stabilized as shown by the solid line in FIG. 5D.

As described above, in this embodiment, when the partial-cylinder operation is switched to the all-cylinder operation in the idling condition of the engine 1, i.e., when increasing the number of the operating cylinders, the basic throttle valve opening THCB is switched from the basic value THCBIP for the partial-cylinder operation to the basic value THCBIA for the all-cylinder operation, and the basic throttle valve opening THCB is corrected with the transient state correction term THTR in the closing direction during the predetermined time period TTR0. Therefore, the amount of air supplied to the engine 1 can be prevented from temporarily becoming excessive when increasing the number of the operating cylinders, to make it possible to suppress the fluctuation in the idling rotational speed or in the engine power torque.

Further, according to one example, the transient state correction term THTR is set to the predetermined value THTR0 at the same time the basic throttle valve opening THCB is switched. Thereafter, the transient state correction term THTR can be gradually decreased with the predetermined subtraction term DTH0. The intake pressure PBA at the portion downstream of the throttle valve 3 approaches the value suitable for the number of operating cylinders as the time elapses from the switching of the number of operating cylinders. Accordingly, the amount of air supplied to the engine 1 can be maintained at a proper value by gradually decreasing the transient state correction term THTR.

Further, the ignition timing IGLOG is controlled so that the detected engine rotational speed NE coincides with the target rotational speed NEOBJ. Accordingly, it is possible to surely avoid the fluctuation in the engine rotational speed NE after changing the number of operating cylinders.

In this embodiment, the throttle valve 3 may correspond to the intake air control valve. The crank angle position sensor 10 may correspond to the rotational speed detecting means. The ECU 5 and the actuator 11 may constitute the intake air amount control means. The ECU 5 may also constitute the switching means, the correcting means, and the ignition timing control means. Specifically, in one example, the process of FIG. 3 may correspond to the intake air amount control means. In an embodiment, the process of FIG. 4 may correspond to the ignition timing control means. Further, steps S11 to S14 of FIG. 3 may correspond to the switching means, and steps S14 to S18 may correspond to the correcting means.

Figure 6A:
FIGS. 6A-6D are time charts for illustrating a control operation in a modification.
Figure 6B:
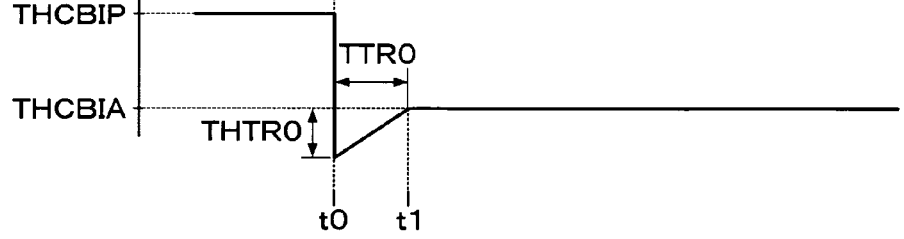
Figure 6C:
Figure 6D:
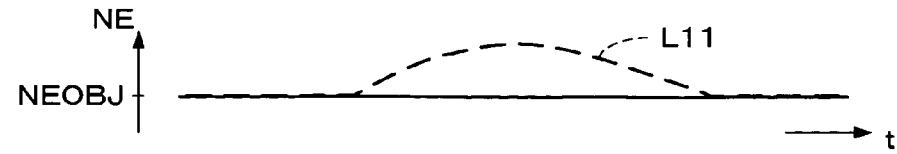

The present invention is not limited to the embodiment(s) described above, and various modifications may be made. For example, in the embodiment described above, the throttle valve opening in the idling condition of the engine 1 is set to a value in the region R1 of FIG. 2. Alternatively, the throttle valve opening in the idling condition of the engine 1 may be set to a value in the region R2. In this case, the output torque in the all-cylinder operation becomes greater than the output torque in the partial-cylinder operation when the throttle valve opening TH is maintained at the same value. Therefore, the basic value THCBIP for the partial-cylinder operation can be set to a value greater than the basic value THCBIA for the all-cylinder operation, as shown in FIG. 6B. Except for this point, this modification is the same as the embodiment described above, and the processes of FIGS. 3 and 4 can be applied without any modification.

In this modification, the target throttle valve opening THCMD can be set to (THCBIA-THTR0) at time t0, as shown in FIG. 6B, and controlled to gradually increase to coincide with the basic value THCBIA for the all-cylinder operation at time t1. In this modification, the same advantageous effect as that of the embodiment described above can be obtained.

Further, in the embodiment described above, the throttle valve 3 of the DBW (Drive By Wire) type is used. The throttle valve 3 is used as the intake air control valve, and the actuator 11 and the ECU 5 constitute the intake air amount control means. Alternatively, a throttle valve mechanically linked to the accelerator pedal, a bypass passage which bypasses the throttle valve, and a bypass air amount control valve for controlling an amount of air flowing through the bypass passage may be used. In such modification, the ECU can control the intake air flow rate by controlling the bypass air amount control valve. In this modification, the bypass air amount control valve may correspond to the intake air control valve, and the ECU 5 may constitute the intake air amount control means.

The present invention can also be applied to a control system for a watercraft propulsion engine such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having a plurality of cylinders and a cylinder halting mechanism for halting operation of at least one of said plurality of cylinders by stopping operation of at least one intake valve of said at least one cylinder, said control system comprising:

operation control means for increasing a number of operating cylinders in an idling condition of said engine, and continuing the idling operation of said engine after the increase in the number of operating cylinders;

an intake air control valve for controlling an amount of air supplied to said engine, said intake air control valve being a throttle valve disposed upstream of said at least one intake valve; and intake air amount control means for changing an opening of said intake air control valve when said operation control means increases the number of operating cylinders, wherein said intake air amount control means comprises
switching means for switching a basic opening of said intake air control valve from a first basic opening corresponding to the number of operating cylinders before the increase in the number of operating cylinders to a second basic opening corresponding to the number of operating cylinders after the increase in the number of the operating cylinders, the second basic opening being greater than the first basic opening; and correcting means for correcting the basic opening in the closing direction during a predetermined time period when increasing the number of operating cylinders, wherein said correcting means sets a correction amount for correcting the basic opening in the decreasing direction to a predetermined amount at the same time said switching means switches the basic opening, and thereafter gradually decreases the correction amount.

2. The control system according to claim 1, further comprising:

rotational speed detecting means for detecting a rotational speed of said engine; and ignition timing control means for controlling an ignition timing of said engine so that the detected rotational speed coincides with a target rotational speed.

3. A control method for an internal combustion engine having a plurality of cylinders, a cylinder halting mechanism for halting operation of at least one of said plurality of cylinders by stopping operation of at least one intake valve of said at least one cylinder, and an intake air control valve for controlling an amount of air supplied to said engine, said intake air control valve being a throttle valve disposed upstream of said at least one intake valve, said control method comprising the steps of:

increasing a number of operating cylinders in an idling condition of said engine, and continuing the idling operation of said engine after the increase in the number of operating cylinders;

changing an opening of said intake air control valve when increasing the number of operating cylinders, by switching a basic opening of said intake air control valve from a first basic opening corresponding to the number of operating cylinders before the increase in the number of operating cylinders to a second basic opening corresponding to the number of operating cylinders after the increase in the number of the operating cylinders, the second basic opening being greater than the first basic opening; and correcting the basic opening in the closing direction during a predetermined time period when increasing the number of operating cylinders, wherein a correction amount for correcting the basic opening in the decreasing direction is set to a predetermined amount at the same time the basic opening is switched in said changing step, and thereafter the correction amount is gradually decreased.

4. The control method according to claim 3, wherein a correction amount for correcting the basic opening in the decreasing direction is set to a predetermined amount at the same time the basic opening is switched in said changing step, and thereafter the correction amount is gradually decreased.

5. The control method according to claim 3, further comprising the steps of:

detecting a rotational speed of said engine; and controlling an ignition timing of said engine so that the detected rotational speed coincides with a target rotational speed.

6. A control system for an internal combustion engine having a plurality of cylinders and a cylinder halting mechanism for halting operation of at least one of said plurality of cylinders by stopping operation of at least one intake valve of said at least one cylinder, said control system comprising:

an operation control unit configured to increase a number of operating cylinders in an idling condition of said engine, and to continue the idling operation of said engine after the increase in the number of operating cylinders;

an intake air control valve configured to control an amount of air supplied to said engine, said intake air control valve being a throttle valve disposed upstream of said at least one intake valve; and an intake air amount control unit configured to change an opening of said intake air control valve when said operation control unit increases the number of operating cylinders, wherein said intake air amount control unit comprises
a switching unit configured to switch a basic opening of said intake air control valve from a first basic opening corresponding to the number of operating cylinders before the increase in the number of operating cylinders to a second basic opening corresponding to the number of operating cylinders after the increase in the number of the operating cylinders, the second basic opening being greater than the first basic opening; and a correcting unit configured to correct the basic opening in the closing direction during a predetermined time period when increasing the number of operating cylinders, wherein said correcting unit is configured to set a correction amount for correcting the basic opening in the decreasing direction to a predetermined amount at the same time said switching unit switches the basic opening, and thereafter gradually decrease the correction amount.

7. The control system according to claim 6, further comprising: a rotational speed detecting unit configured to detect a rotational speed of said engine; and an ignition timing control unit configured to control an ignition timing of said engine so that the detected rotational speed coincides with a target rotational speed.

* * * * *